US011951879B2

(12) United States Patent
Pedronno et al.

(10) Patent No.: US 11,951,879 B2
(45) Date of Patent: Apr. 9, 2024

(54) SEATING SYSTEM WITH EASY ENTRY IN THE THIRD ROW

(71) Applicant: FAURECIA Sièges d'Automobile, Nanterre (FR)

(72) Inventors: Philippe Pedronno, Marcoussis (FR); Farouk Bouzid, Bretigny sur Orge (FR)

(73) Assignee: FAURECIA Sièges d'Automobile, Nanterre (FR)

(*) Notice: Subject to any disclaimer, the term of this patent is extended or adjusted under 35 U.S.C. 154(b) by 251 days.

(21) Appl. No.: 17/672,078

(22) Filed: Feb. 15, 2022

(65) Prior Publication Data
US 2022/0258652 A1 Aug. 18, 2022

(30) Foreign Application Priority Data

Feb. 17, 2021 (FR) ..................... 21 01503

(51) Int. Cl.
*B60N 2/02* (2006.01)
*B60N 2/12* (2006.01)

(52) U.S. Cl.
CPC ....... *B60N 2/0276* (2013.01); *B60N 2/02246* (2023.08); *B60N 2/12* (2013.01); *B60N 2/0272* (2023.08)

(58) Field of Classification Search
CPC .... B60N 2/0276; B60N 2/02246; B60N 2/12; B60N 2/0272; B60N 2/0244; B60N 2/0256; B60N 2/06; B60N 2/2893; B60N 2/14

(Continued)

(56) References Cited

U.S. PATENT DOCUMENTS

| 4,547,718 A | 10/1985 | Ratzel |
| 7,023,108 B2 | 4/2006 | Itami |

(Continued)

FOREIGN PATENT DOCUMENTS

| CN | 108698699 A | * 10/2018 | ............... B60N 2/12 |
| DE | 60301103 T2 | 3/2006 | |

(Continued)

OTHER PUBLICATIONS

International Standard ISO13216-1, Road vehicles—Anchorages in vehicles and attachments to anchorages for child restraint systems, Amendment 1: CRF reduced height specification, Part 1: Seat bight anchorages and attachments, Amendment Feb. 15, 2006, 7 pages.

(Continued)

*Primary Examiner* — Muhammad Shafi
(74) *Attorney, Agent, or Firm* — Barnes & Thornburg LLP

(57) ABSTRACT

A seating system for a vehicle, comprising, from the front to the rear of the vehicle: a first seat, a second seat, a third seat, the first seat, second seat, and third seat being located one behind the other in a longitudinal direction of the vehicle, the second seat being provided with a mechanism configured to cause, at least in an easy entry mode, the transition of the second seat from a position of use to an advanced position of non-use configured to facilitate lateral access to the third seat in the third row, and wherein a control device configured to limit automatically the amplitude of the kinematics of the mechanism, by the detection of an indirect contact between the second seat and the first seat, when the mechanism of the second seat is operated, in easy entry mode, from the position of use to the advanced position of non-use.

17 Claims, 6 Drawing Sheets

Figure 1:
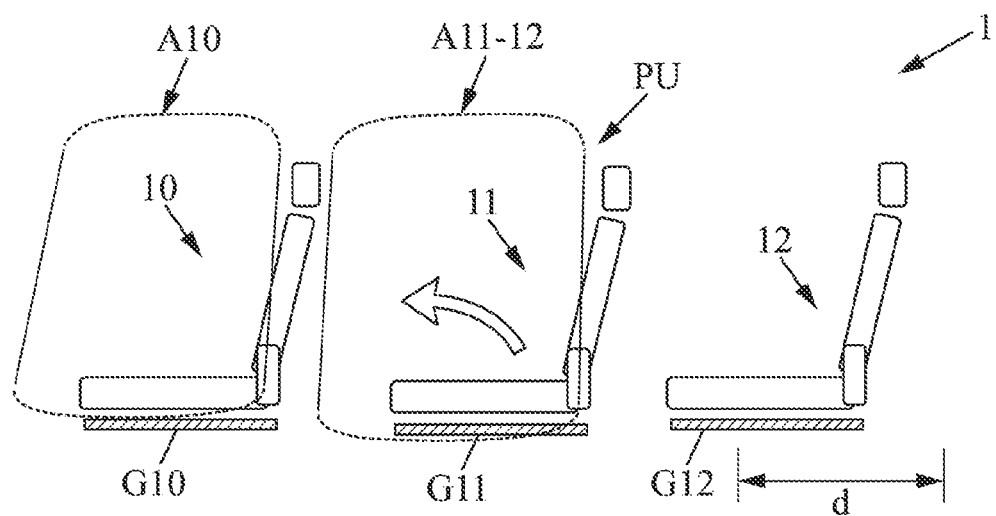

(58) Field of Classification Search
USPC .......................................................... 701/49
See application file for complete search history.

(56) References Cited

U.S. PATENT DOCUMENTS

| | | | |
|---|---|---|---|
| 7,138,779 B2 | 11/2006 | Robert | |
| 10,065,529 B1* | 9/2018 | Miranda Nieto | ........ B60N 2/22 |
| 2009/0195037 A1* | 8/2009 | Plavetich | ............. B60N 2/0252 |
| | | | 297/257 |
| 2010/0084903 A1 | 4/2010 | Kaemmerer | |
| 2012/0235006 A1* | 9/2012 | Sailer | ....................... B60N 2/01 |
| | | | 248/429 |
| 2016/0374468 A1* | 12/2016 | Hashemi | ................. A47C 7/626 |
| | | | 297/391 |
| 2017/0174100 A1* | 6/2017 | Reynolds | ........... B60H 1/00407 |
| 2018/0354397 A1* | 12/2018 | Leck | ..................... B60N 3/001 |
| 2019/0156110 A1* | 5/2019 | De Hoog | .................. G06F 3/14 |
| 2021/0070199 A1 | 3/2021 | Matha | |

FOREIGN PATENT DOCUMENTS

| | | | |
|---|---|---|---|
| DE | 602004004470 T2 | 8/2007 | |
| DE | 202021105363 U1 * | 12/2021 | ............. B60N 2/305 |
| DE | 102023105793 A1 * | 9/2023 | ............. B60N 2/012 |
| EP | 1393965 A1 | 3/2004 | |
| EP | 3395686 A1 * | 10/2018 | ............. B60N 2/045 |
| FR | 2861339 A1 | 4/2005 | |
| WO | WO-2011062869 A1 * | 5/2011 | ............... B60N 2/02 |

OTHER PUBLICATIONS

International Standard ISO13216-1, Road vehicles—Anchorages in vehicles and attachments to anchorages for child restraint systems, Part 1: Seat bight anchorages and attachments, Amendment 3: Specifications for the detection of use of ISOFIX CRS, Amendment Jul. 1, 2006, 10 pages.
International Standard ISO13216-1, Road vehicles—Anchorages in vehicles and attachments to anchorages for child restraint systems, Part 1: Seat bight anchorages and attachments, Dec. 15, 1999, 25 pages.

* cited by examiner

SEATING SYSTEM WITH EASY ENTRY IN THE THIRD ROW

PRIORITY CLAIM

This application claims priority to French Patent Application No. FR2101503, filed Feb. 17, 2021, which is expressly incorporated by reference herein.

BACKGROUND

The present disclosure relates to a seating system for a vehicle, comprising, from the front to the rear of the vehicle, a first seat of a first row, a second seat of a second row, optionally a third seat in a third row, and wherein the second seat is provided with a mechanism configured to cause it to advance towards the first seat.

More particularly, the mechanism is configured to cause, at least in an easy-entry mode, the transition of the second seat from a position of use configured to receive an occupant, to an advanced position of non-use configured to facilitate lateral access to the third seat of the third row.

This disclosure also relates to a method for controlling such a seating system, as well as to a computer program which comprises a set of computer-readable instructions which, when loaded by an appropriate system, executes the steps of the control process.

SUMMARY

According to the present disclosure, a seating system for a vehicle, comprises, from the front to the rear of the vehicle: a first seat of a first row, a second seat of a second row comprising a mechanism of the second seat configured to advance the second seat towards the first seat.

In illustrative embodiments, the seating system comprises a control device configured to limit automatically the amplitude of the kinematics of the mechanism of the second seat, by the detection of an indirect contact between the second seat and the first seat when the mechanism of the second seat is operated.

The features set forth in the following paragraphs may optionally be implemented, independently of one another or in combination with one another:

In illustrative embodiments, the seating system comprises a third seat in a third row, the first seat, second seat, and third seat being located one behind the other in a longitudinal direction of the vehicle, the second seat being provided with the mechanism configured to cause, at least in an easy entry mode, the transition of the second seat from a position of use configured to receive an occupant, to an advanced position of non-use configured to facilitate lateral access to the third seat of the third row, and wherein the seating system comprises the control device configured to limit automatically the magnitude of the kinematics of the mechanism, by the detection of an indirect contact between the second seat and the first seat, when the mechanism of the second seat is operated, in easy entry mode, from the position of use to the advanced position of non-use.

In illustrative embodiments, the second seat receives a child seat, resting on a seating portion and/or against a backrest of the second seat, and wherein the indirect contact between the first seat and the second seat for which the control device limits automatically the amplitude of the kinematics of the hinge mechanism is a contact between the first seat and second seat via a squeezing of the child seat.

In illustrative embodiments, the seating system is motorized and the second seat comprises a motor configured to cause its advancement towards the first seat, and the control device is configured to control the stopping of the motor upon the detection of an indirect contact, possibly followed by a slight reverse movement of the second seat on the order of 5 mm to 20 mm.

In illustrative embodiments, the motor of the second seat is configured to cause, during a command actuating the easy entry mode, the movement of the second seat from the position of use to the advanced position of non-use, and the control device is configured to control the stopping of the motor upon the detection of an indirect contact, possibly followed by a slight reverse movement of the second seat on the order of 5 mm to 20 mm.

According to one embodiment of the motorized seating system, the first seat comprises slides connecting the first seat to the floor of the vehicle, the slides oriented in the longitudinal direction of the vehicle, and a motor of the first seat, configured to move the first seat forward or backward relative to the floor by the sliding of the slides, and wherein during the command actuating easy entry mode, the control device is configured for:

moving the first seat by sliding the slides under the action of the motor of the first seat from a current position of the first seat to an advanced position of the first seat, at least when no occupant is detected on the first seat, moving the second seat from the position of use to the advanced position of non-use while limiting the amplitude of the kinematics of the mechanism when an indirect contact is detected between the first seat and the second seat. During the indirect contact, the first seat is in the advanced position of the first seat when no occupant is detected, or in the current position of the first seat when an occupant is detected.

According to one embodiment of the motorized seating system, the second seat comprises two lower anchors, at the joining area between the seating portion and the backrest of the second seat, to which are respectively secured two attachment systems of the child seat, the or each of the two lower anchors comprising a means of detecting an attachment on the lower anchor, intended for detecting the presence of the child seat, wherein the control device is configured to cause, during the command actuating the easy entry mode, even in the case of detection of an attachment on the lower anchor by the detection means, the motorized movement of the second seat from the position of use to the advanced position of non-use, and wherein the control device is configured to cause the stopping of the motor of the second seat upon the detection of an indirect contact between the first seat and the second seat via a squeezing of the child seat.

According to one embodiment, the control device comprises a squeezing detection system, and the indirect contact is detected by detecting a squeezing.

According to one embodiment of the motorized seating system, the control device can be configured for measuring/detecting at least one operating parameter of the motor among the motor current and/or the motor speed, when the second seat is moving forward along a path of travel (in particular from the position of use to the position of non-use), in a direction of movement of the second seat, when actuated by the second seat motor (in particular in easy entry mode), the control device being configured to ensure the stopping of the motor when the at least one parameter of the current measurement crosses at least one threshold, and wherein the at least one threshold has a plurality of determined values associated with different positions of the second seat along the path of travel permitted by the mechanism, at least in the forward direction of movement of the second seat (in particular from the position of use to the advanced position of non-use), the control device being configured for, at least in a monitoring mode (in particular in at least the easy entry mode), detecting/measuring a current position of the second seat along the path of travel during its actuation by the motor of the second seat, when the second seat is moving in the direction of movement, and comparing, for each of the different positions of the second seat along the path of travel, a current measurement of the at least one operating parameter of the motor with the value of the threshold associated with the operating parameter determined for the associated position at the current position of the second seat, and so as to cause the stopping of the motor when the at least one threshold is crossed.

In illustrative embodiments, the control device has calibration means configured for determining the values of the at least one threshold along the path of travel, in the different positions of the second seat along the path of travel, at least in the direction of movement, in at least one calibration mode of the control device, prior to the monitoring mode (in particular the easy entry mode), by implementing:

/A/ a measurement in which the at least one operating parameter chosen among the current and/or the speed of the motor is measured during at least one motorized movement of the second seat at the different positions of the second seat along the path of travel, at least in the direction of movement, /B/ a determination of the determined values of the at least one threshold in relation to the different positions of the seat, in the direction of movement, by applying a margin of tolerance with respect to the values of the operating parameter detected/measured during /A/.

In illustrative embodiments, the margin of tolerance in /B/ can be determined by calculation, by applying a multiplying factor to the measurements acquired in /A/: greater than 1, between 1.05 and 1.30, in order to determine an upper threshold, and/or less than 1, between 0.7 and 0.95, in order to determine a lower threshold.

The measurement according to /A/ can be implemented during the first movement of the second seat along the path of travel, or else the measurement according to /A/ can be implemented over several movements of the second seat as a function of the position of the seat along the path of travel.

In illustrative embodiments, the control device comprises a microcontroller MCU recording the measurements in /A/ according to a sampling period, along the path of travel of the seat, which is less than the time used by the seat to travel the path of travel by a ratio of 10, or even by a ratio of 100.

In illustrative embodiments, the control device detects an indirect contact when a current measurement crosses an upper threshold of an operating parameter of the motor relating to the current intensity and/or a lower threshold of an operating parameter of the motor relating to the speed of the motor.

In illustrative embodiments, the values determined according to different positions of the second seat along the path of travel in the direction of movement, comprise:

values of a first threshold associated with the different positions of the second seat when the means for detecting an attachment on the lower anchor does not detect any attachment, corresponding to an operation of the empty second seat during easy entry mode, values of a second threshold associated with the different positions of the second seat when the means for detecting an attachment on the lower anchor detects an attachment, corresponding to an operation of the second seat loaded with the child seat, during easy entry mode.

In illustrative embodiments, the mechanism comprises connecting rods ensuring the kinematics of the second seat from the first position of use to the advanced position of non-use, facilitating access to the third seat, and wherein the kinematics comprise a tilting of the second seat including:

an inclination of the seating portion for which the front edge of the seating portion is moved to a level lower than the rear edge of the seating portion, the backrest not being folded down against the seating portion, or even an increase in the angle of the opening between the seating portion and the backrest.

According to a second aspect, this disclosure relates to a method for controlling a seating system for a vehicle, comprising, from the front to the rear of the vehicle: a first seat of a first row, a second seat of a second row, and a third seat in a third row, the first seat, second seat, and third seat being located one behind the other in a longitudinal direction of the vehicle, the second seat being provided with a mechanism configured to cause, at least in an easy entry mode, the transition of the second seat from a position of use configured to receive an occupant, to an advanced position of non-use configured to facilitate lateral access to the third seat of the third row, under the action of a motor controlled by a control device, and wherein the second seat carries an object, such as a child seat, resting on the seating portion or even against the backrest of the seat, and wherein, upon receiving a command to transition the second seat from the position of use to the advanced position of non-use, the method comprises:

/a/ a motorized actuation of the second seat from the position of use with a view to moving it into the advanced position of non-use, and possibly a motorized advancement of the first seat from a current position to a position advanced towards the front of the vehicle, /b/ a limitation of the amplitude of the kinematics of the mechanism with a stopping of the motor of the second seat upon the control device detecting a squeezing representative of an indirect contact between the first seat and the second seat via a squeezing of the object, in an advanced intermediate position of non-use of the second seat configured to facilitate access to the third seat.

According to a third aspect, this disclosure relates to a computer program comprising instructions for implementing all or part of a method according to this disclosure when the program is executed by a processor.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
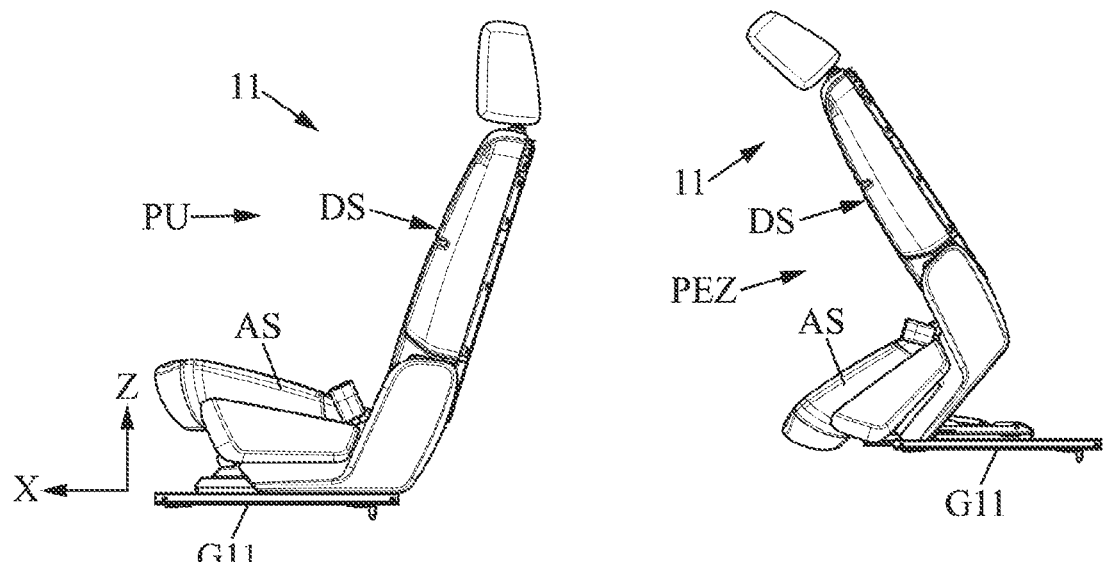
Figure 3:
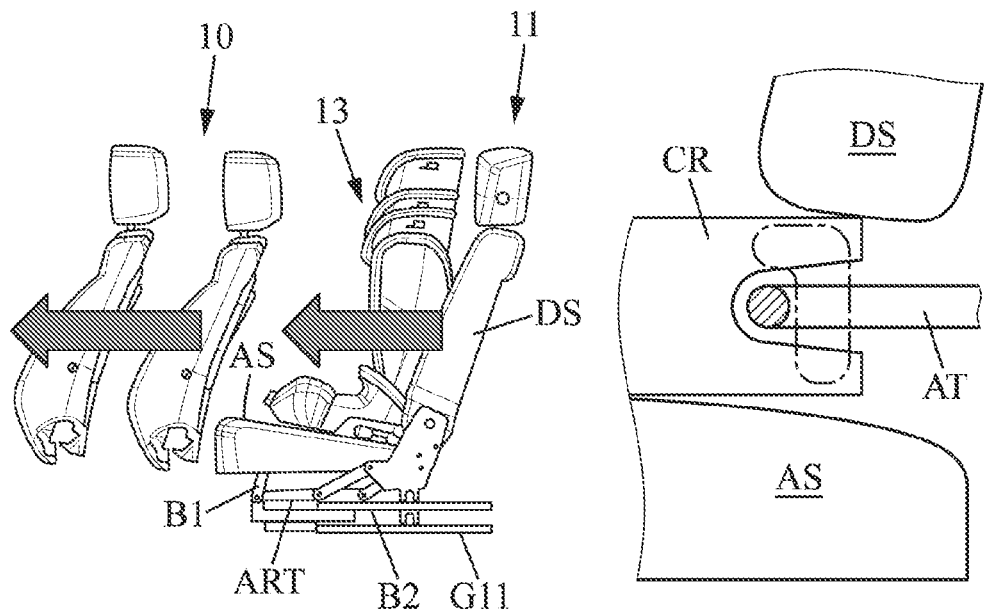
Figure 4:
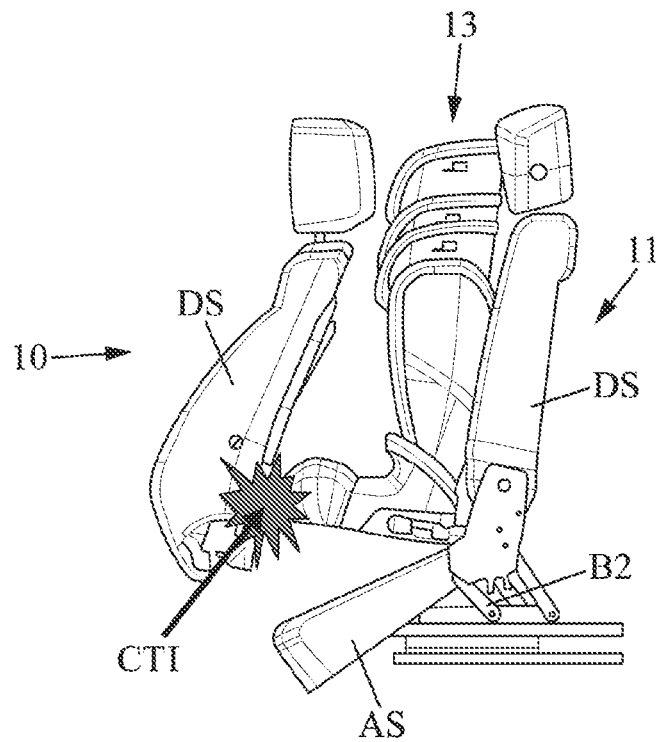
Figure 5:
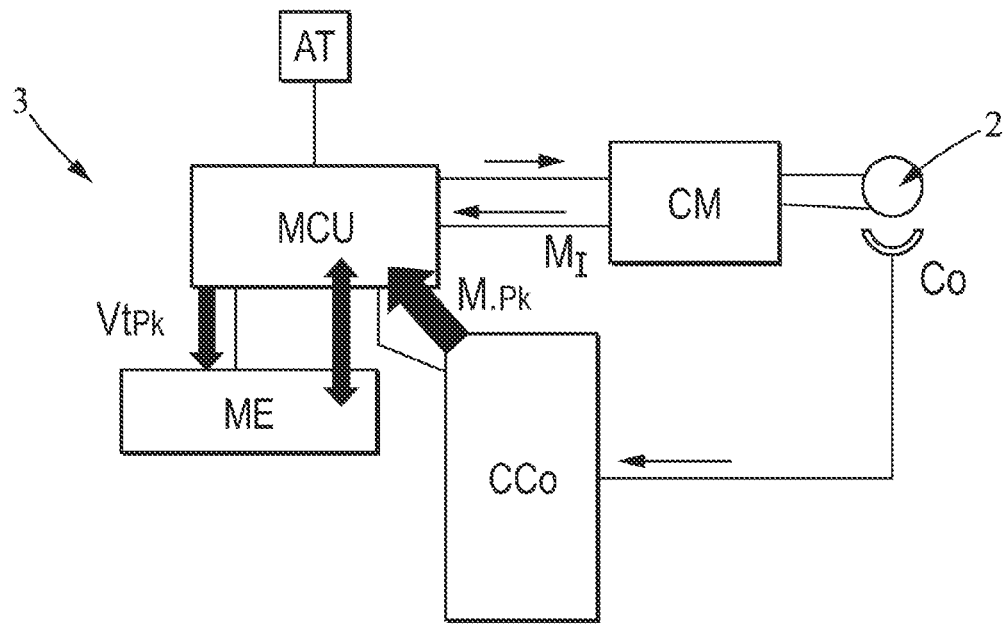
Figure 6:
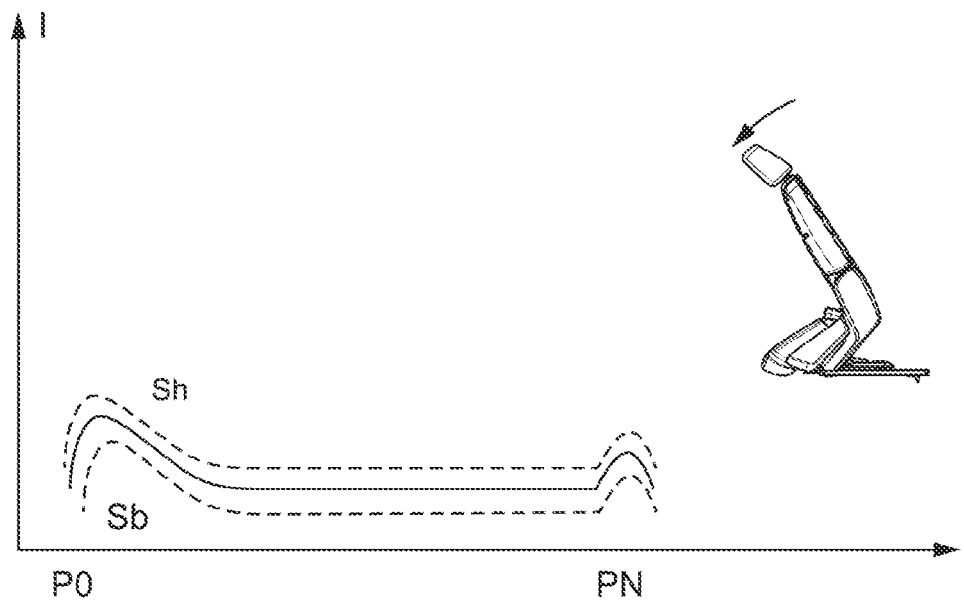
Figure 7:
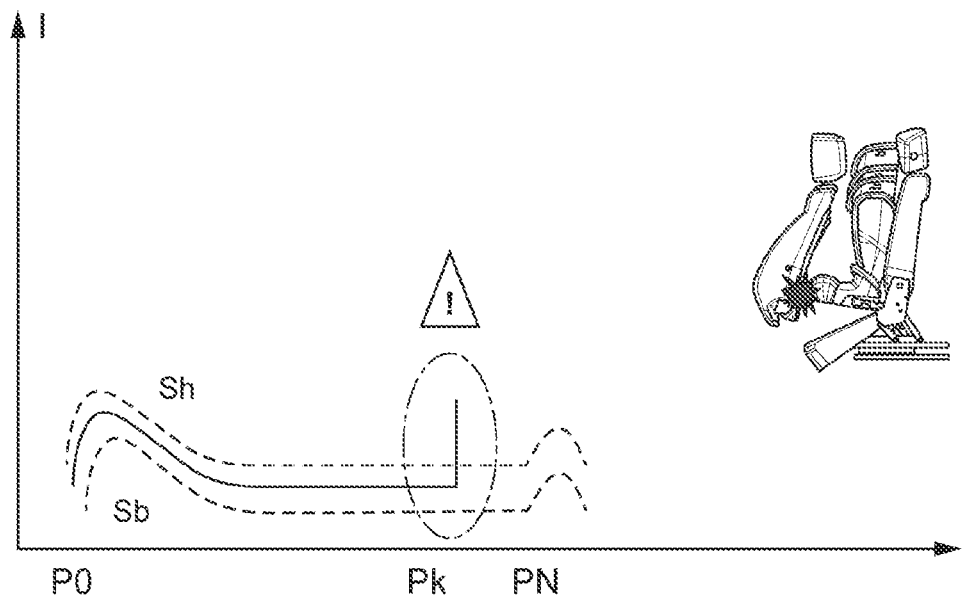
Figure 8:
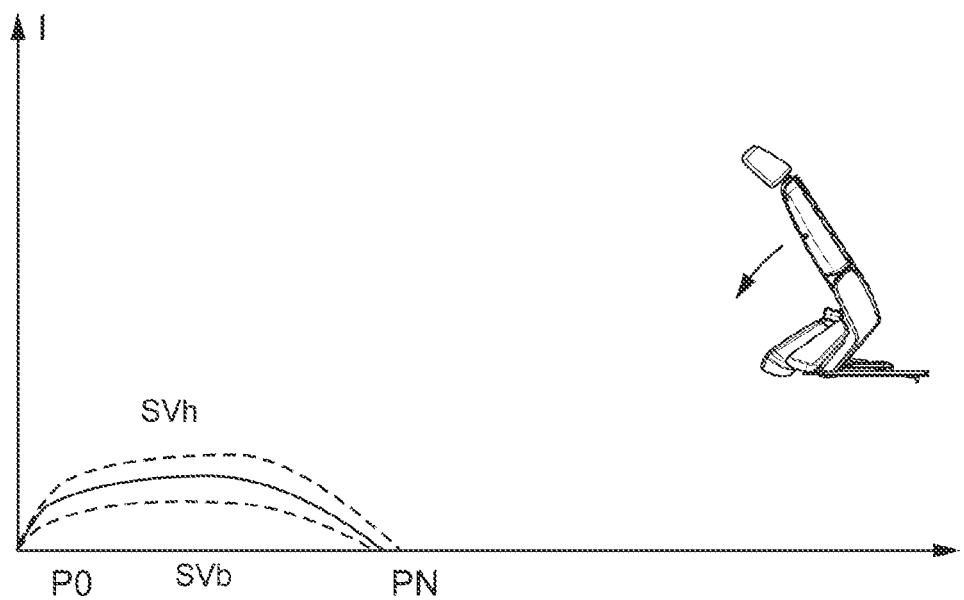
Figure 9:
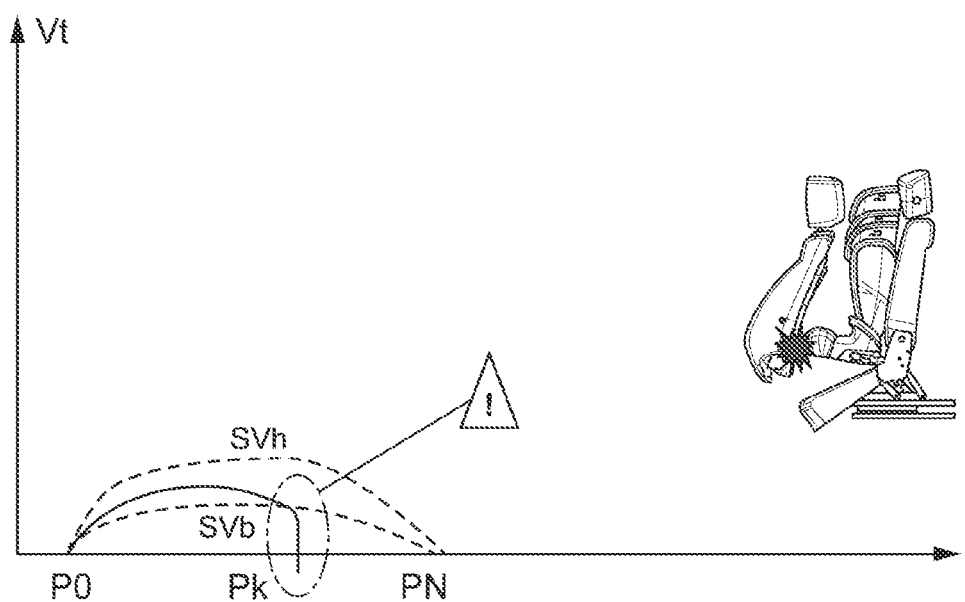
Figure 10:
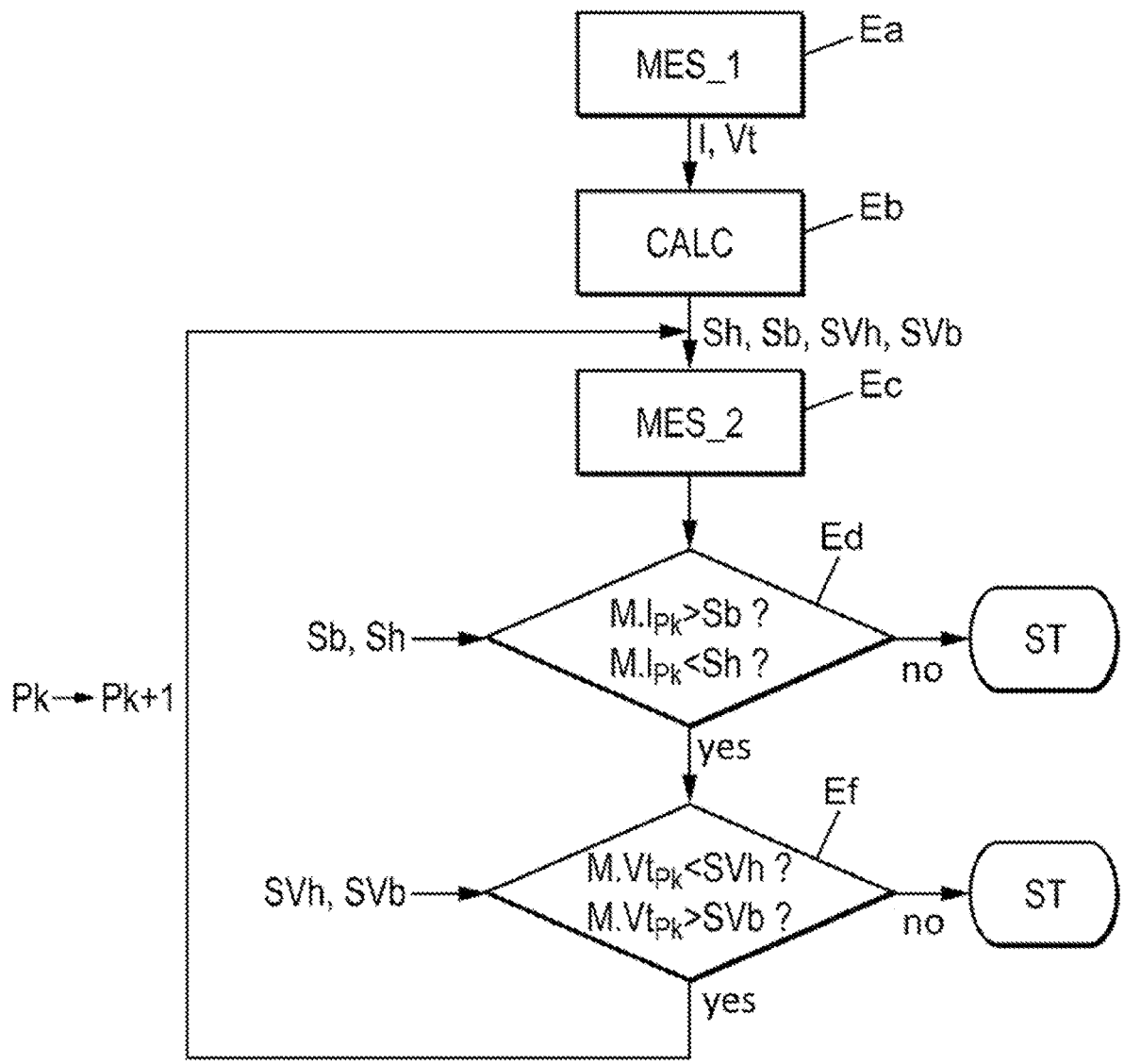

The detailed description particularly refers to the accompanying figures in which:

FIG. 1 is a schematic side view of a seating system according to this disclosure, comprising, from the front to the rear of the vehicle, in a longitudinal direction of the vehicle: a first seat, a second seat, and a third seat, respectively arranged in three consecutive rows of the seating system, entry (or exit) to the first seat being permitted by a first access, illustrated by a dotted line, defined between a front pillar and a central pillar in the longitudinal direction of the vehicle, entry (or exit) to the second seat and third seat being permitted by a second access illustrated by a dotted line, defined between the central pillar and a rear pillar of the vehicle in the longitudinal direction of the vehicle;

FIG. 2 shows two side views of an embodiment of a second seat according to this disclosure, in the normal position of use (left), and in the advanced position of non-use (right) after the second seat is tilted forward so as to increase the space between the second seat and third seat while unobstructing the second access, namely in a position facilitating entry into the third seat;

FIG. 3 shows, on the left, a partial view of the control method according to this disclosure, implemented upon receiving a command in easy entry mode, intended to facilitate access (entry or exit) to the third seat via the second access of the vehicle, the method providing for motorized actuation of the first seat from a current position to an advanced position, provided that no occupant is detected in the first seat, and jointly (simultaneously or sequentially), motorized actuation of the second seat from the position of use to the advanced position of non-use, the second seat carrying a child seat fixed by two attachment systems engaging with two lower anchors, at the joining area between the backrest and the seating portion, according to the ISOFIX standard; FIG. 3 schematically illustrating, on the right, in a vertical section view, the attachment of a child seat attachment system to a lower anchor;

FIG. 4 is a view consecutive to FIG. 3, illustrating an indirect contact between the first seat and the second seat, thus driven towards the advanced position of non-use called easy entry, via a squeezing the child seat, this indirect contact being detected by a control device configured to limit the amplitude of the kinematics of the second seat, with no chance of damage to the seats, the second seat then being in an advanced intermediate position of non-use of the second seat, still configured to facilitate access to the third seat;

FIG. 5 illustrates a possible example of the architecture of the control device, and in particular of the control device allowing not only the control of the motor of the second seat in easy entry mode for which the control device compares the real-time current measurement of an operating parameter of the motor, such as the current intensity and/or the speed, with the value of the threshold associated with the operating parameter determined for the position associated with the current position of the second seat, and so as to cause the stopping of the motor when the at least one threshold is crossed, but also optionally, and prior to this "easy entry" mode with the monitoring, the implementation of a calibration mode with automatic learning of the values of the operating parameter or parameters of the motor (current intensity and/or speed) as a function of the positions of the second seat along the path of travel of the second seat permitted by the mechanism, between the position of use and the advanced position of non-use;

FIG. 6 shows a graph representing the profile of the current intensity of the motor when the second seat is actuated in a first direction of rotation on the path of travel from the position of use to the advanced position of non-use, the graph showing the current intensity of the motor on the ordinate and on the abscissa the position of the second seat on the path of travel, under normal conditions of use (fluid kinematics and without squeezing), this profile of the current intensity allowing calibration of the device for the determination of the threshold (upper threshold and/or lower threshold) associated with the direction of movement;

FIG. 7 shows a graph representing the profile of the current intensity of the motor when the second seat is actuated in the first direction of rotation on the path of travel of the second seat from the position of use to the advanced position of non-use, in easy entry mode of the control device, the current measurement of the current intensity at the current position Pk exceeding the upper threshold (current intensity), this excess representative of an indirect contact (a squeezing of the child seat) triggering the stopping of the motor by the control device;

FIG. 8 shows a graph representing the speed profile of the motor when the second seat is actuated in a first direction of rotation on the path of travel of the second seat from the position of use to the advanced position of non-use, the graph showing the motor speed on the ordinate and on the abscissa the position of the second seat on the path of travel, under normal conditions of use (fluid kinematics and without squeezing), this speed profile allowing calibration of the device for the determination of the threshold (upper threshold and/or lower threshold) associated with the first direction of movement;

FIG. 9 shows a graph representing the speed profile of the motor when the second seat is actuated in the first direction of rotation on the path of travel of the second seat from the position of use to the advanced position of non-use, in easy entry mode of the control device, the current speed measurement at the current position Pk falling below the lower threshold, representative of an indirect contact, causing the stopping of the motor by the control device;

FIG. 10 shows a functional diagram of the operation of the control device, including the calibration phase (Steps Ea and Eb) for which the at least one threshold is determined, and easy entry mode (Steps Ed and Ef) with monitoring of the thresholds, during which the device measures and controls two operating parameters of the motor—the current intensity and the speed—with implementation of an upper threshold and lower threshold for each of these two operating parameters, as one possible example, and triggers the stopping of the motor as soon as the measurement crosses a threshold (upper or lower).

DETAILED DESCRIPTION

Thus, this disclosure relates to a seating system 1 for a vehicle, comprising, from the front to the rear of the vehicle: a first seat 10 of a first row, a second seat 11 of a second row, and a third seat 12 in a third row.

The first seat, the second seat, and the third seat are located one behind the other in a longitudinal direction d of the vehicle, and with reference to FIG. 1.

The vehicle has a first access opening A10 (right or left) typically delimited, in the longitudinal direction d, between a front pillar and a central pillar of the vehicle body, giving access to the first seat 10 of the first row. The first row of seats may include a driver's seat and a passenger seat. The first seat 10 may be the driver's seat or the passenger seat.

The first seat 10 comprises a seating portion and a backrest, the seating portion extending from a front edge to a rear edge, in the longitudinal direction d, and transversely, in width, from a first side edge to a second side edge of the seat.

The backrest of the first seat 10 extends in height, at the rear edge of the seating portion, from a lower edge to an upper edge of the backrest, and in width, in the transverse direction, from a first side edge to a second side edge of the backrest.

Slides G10, typically two in number, connecting the floor of the vehicle to the seating portion frame of the first seat 10, allow the first seat 10 to move forward or backward in the longitudinal direction d. The forward (or backward) movement may be motorized.

Each slide G10 may comprise a pair of profile sections, namely a fixed profile section secured to the vehicle floor and a movable profile section secured to the seating portion frame, slidable along the fixed profile section.

The vehicle has a second access opening A11-12 (right or left), typically delimited, in the longitudinal direction d, between the central pillar and a rear pillar of the vehicle body, giving access to the second seat 11 of the second row.

The second row of seats may comprise (alternatively):
a) one seat, with a single seating portion (bench) extending transversely for the entire width of the passenger compartment,
b) three independent seats, across the width of the vehicle's passenger compartment,
c) one row of two seats ⅓-⅔, with one seat for which the seating portion extends transversely for one-third of the width of the passenger compartment of the vehicle and a second seat which extends transversely for the remaining two-thirds of the width of the passenger compartment of the vehicle.

The second seat may be, indiscriminately, the seat with a single seating portion according to a), the seat to the right or the seat to the left of the three independent seats (except for the intermediate seat) according to b), or the seat whose width extends over ⅓ of the passenger compartment or the seat extending over ⅔ of the passenger compartment, according to c).

In general, the second seat 11 comprises a seating portion AS and a backrest DS, the seating portion AS extending from a front edge and to a rear edge in the longitudinal direction d, and transversely, in width, from a first side edge to a second side edge of the seating portion.

The backrest of the second seat extends, in height, at the rear edge of the seating portion, from a lower edge to an upper edge of the backrest DS, and in width, in the transverse direction, from a first side edge to a second side edge of the backrest.

Slides G11, typically two in number, connecting the vehicle floor to the seating portion frame of the second seat 11, allow the second seat 11 to move forward or backward in the longitudinal direction d. The forward (or backward) movement may be motorized.

Each slide G11 may include a pair of profile sections, namely a fixed profile section integral with the vehicle floor, and a movable profile section integral with the seating portion frame, intended to slide along the fixed profile section.

In the position of use PU of the second seat 11, this seat obstructs the second access opening 11-12 as illustrated in FIG. 1, preventing access to the third row, or at the very least not enabling easy access to the seat(s) of the third row.

The second seat 11 is thus provided with a mechanism ART configured to cause, in easy entry mode, the transition of the second seat 11 from a position of use PU configured to receive an occupant, to an advanced position of non-use PEZ called "easy entry", configured to facilitate lateral access to the third seat 12 of the third row.

FIG. 2 illustrates, on the left, according to one embodiment, the second seat in the position of use PU, and on the right, the second seat once in its advanced position of non-use PEZ called "easy entry".

The kinematics allowed by the mechanism ART typically comprise a sliding and/or tilting of the seating portion with an inclination of the seating portion AS for which the front edge of the seating portion is moved to a lower level than that of the rear edge of the seating portion (between the position of use PU and the advanced position of non-use PEZ), the backrest DS then not folded down against the seating portion.

The kinematics allowed by the mechanism ART can still lead to an increase in the angle of the opening between the seating portion AS and the backrest DS, between the position of use (see FIG. 3) and the advanced position of non-use (see FIG. 4) Such a mechanism typically comprises rods B1, B2 each connecting the movable profile section of the slide 11 to the seating portion, with positions offset in the longitudinal direction d. Reference is hereby made to US Patent Publication No. US2010/0084903A1, filed Oct. 1, 2009 and entitled VEHICLE SEAT, IN PARTICULAR MOTOR VEHICLE SEAT for disclosure relating to the mechanism ART, which application is hereby incorporated in its entirety herein.

In the advanced position of use PEZ, the second seat 11 unobstructs at least a portion of the second access opening A11-12, by increasing the space between the second seat and the third seat, and in order to allow and facilitate access (entry or exit) to the third seat from this second access opening A11-12.

The third row 12 of seats may itself comprise a single seat, or even two independent seats, or even possibly three independent seats.

According to this disclosure, the seating system comprises a control device 3 configured to limit automatically the amplitude of the kinematics of the mechanism, by detection of an indirect contact CTI between the second seat 11 and the first seat 10, when the mechanism ART of the second seat 11 is operated, in easy entry mode, from the position of use PU to the advanced position of non-use PEZ.

Indirect contact CTI is understood to mean, when the second seat is carrying an object, such as a child seat 13, resting on the seating portion and/or against the backrest of the second seat, a contact between the second seat and the first seat via the object, in particular via the child seat 13.

The control device 3 according to this disclosure thus advantageously allows
  preventing damage to the first seat and second seat when the object is squeezed between these two seats,
  stopping the second seat 11, often in an advanced intermediate position of non-use of the second seat 12, still configured to facilitate access to the third seat 12 via the second access opening A11-12, by unobstructing at least a portion of the second access opening A11-12, in particular if the first seat is in an advanced position,
  the stopping of the second seat 11 being determined by the detection of an indirect contact, it is ensured that the advanced intermediate position is a position optimized according to the bulk (shape and dimensions) of the child seat carried by the second seat, and therefore dependent specifically on the child seat 13 then resting on the second seat 11.

Thus, and according to one embodiment, the second seat 11 is receiving a child seat 13, resting on a seating portion AS and/or against a backrest DS of the second seat 11, and the indirect contact CTI between the second seat 11 and the second seat 12 for which the control device 3 automatically limits the amplitude of the kinematics of the mechanism ART is a contact between the first seat 10 and the second seat 12 via a squeezing of the child seat 13.

The child seat 13 can include various seats (or even carriers, booster seats, etc.), such as the groups identified by the Geneva UN/ECE Regulation No. 44, or R129, namely:

Group 0, from 0 to 10 kg: group reserved for some infant carriers and mainly carrycots, Group 0+, from 0 to 13 kg: infant seat which is rear-facing, Group 1, from 9 to 18 kg: seats for older infants with harness or impact shield, and rear or forward facing, Group 2, from 15 to 25 kg: booster seats with backrest, but also rear-facing seats, Group 3, from 22 to 36 kg: booster seats with or without backrest.

According to one embodiment, the second seat 11 comprises two lower anchors AT at the joining area between the seating portion AS and the backrest DS of the second seat 11 to which are respectively secured two attachment systems CR of the child seat 13. The engagement of the attachment system and the lower anchors is schematically illustrated on the right in FIG. 3. These are lower anchors typically referred to as the name ISOFIX referring to the ISO 13216-1 standard: 1999 "Anchorages in vehicles and attachments to anchorages for child restraint systems", or also referred to in the United States by the acronym LATCH for "Lower Anchors and Tethers for Children".

Each of the two lower anchors AT may comprise a means for detecting an attachment to the lower anchor, intended to detect the presence of the child seat. It may be a lower anchor as disclosed by U.S. Pat. No. 10,065,529 which comprises a segment of an electrical circuit which is open when the attachment system of the seat is not connected to the lower anchor and which is electrically closed when the seat is attached to the lower anchor.

According to this disclosure, and even when a child seat 13 is detected as attached to the lower anchors AT, the control device 3 is configured to allow the movement of the second seat 2 from the position of use PU to the advanced position, as long as the control device 3 does not detect an indirect contact CTI between the first seat 10 and second seat 11, via a squeezing of the child seat, namely when the child seat 13 carried by the second seat 11 comes into contact with the back of the first seat 10.

It is ensured that the second seat 10 is moved as far as possible towards the advanced position of non-use PEZ so as to give optimized access to the third row of seats, namely access optimized according to the model of the child seat 13 resting on the second seat 11.

According to one embodiment, the second seat 11 comprises a motor 2 configured to cause, during an actuation command in the easy entry mode, the movement of the second seat 2 from the position of use PU to the advanced position of non-use PEZ, and wherein the control device 3 is configured to control the stopping of the motor 2 upon detection of an indirect contact CTI.

The stopping of the motor may optionally be followed by a small reverse displacement of the second seat 12, for example on the order of 5 mm to 20 mm, for example 10 mm, in order to eliminate the indirect contact, in particular the contact between the object (such as the child seat) 13 and the back portion of the backrest of the first seat 10.

According to one embodiment, the motorized seating system further comprises a motor for the first seat 10, configured to move the first seat 10 forward or backward relative to the floor by sliding the slides G11 along the longitudinal direction d.

According to one embodiment, during the actuation command in easy entry mode, the control device 3 can then advantageously be configured for:

moving the first seat 10 by sliding the slides G10 under the action of the seat motor of the first seat, from a current position of the first seat 10 to an advanced position of the first seat 10, provided that no occupant is detected on the first seat 10, moving the second seat 11 from the position of use PU to the advanced position of non-use PEZ while limiting the amplitude of the hinge kinematics upon detection of an indirect contact CTI between the first seat 10 and the second seat 11. During the indirect contact CTI, the first seat is then in the advanced position of the first seat (when no occupant is detected), or alternatively in the current position of the first seat (when an occupant is detected).

The presence of an occupant in the first seat can be detected by a sensor of the seating portion, detecting pressure on the seating portion. This may be a sensor already being used (in particular on the passenger seat) to emit an alert (audible and/or visual) to notify the occupant of the passenger seat that the seat belt is not fastened. When the sensor detects the presence of an occupant on the first seat, the first seat 10 is not moved.

According to one embodiment, the or each of the two lower anchors AT intended for attachment of the child seat 13 comprises a means for detecting an attachment onto the lower anchor, intended to detect the presence of a child seat.

The control device 3 is then configured, during the actuation command in the easy entry mode, to cause, even in the event of detection of an attachment on the lower anchor by the detection means, the motorized movement of the second seat from the position of use PU to the advanced position of non-use PEZ, the control device 3 then being configured to cause the stopping of the motor of the second seat 11 upon detection of an indirect contact CTI between the first seat 10 and the second seat 11, via a squeezing of the child seat 12.

The signal emitted by the detection means can be used as input to the control device 3 to control the motor 2 of the second seat 11 during its movement from the position of use PU to the advanced position of non-use PEZ, and according to two separate verifications, with a first control mode (empty operation of the second seat) when no child seat is detected by the detection means, and a second control mode (operation when loaded with a child seat) when the detection means emits a signal representative of the presence of a child seat. One embodiment is described in more detail below.

According to one embodiment, the control device 3 comprises a squeezing detection system, and the indirect contact CTI is detected by detecting a squeezing.

In the case of a motorized seating system, this concerns in particular a device for detecting squeezing by close monitoring of the current I consumed by the motor 2 of the second seat and/or by close monitoring of the rotational speed Vt of the motor when the seat is moved according to the kinematics allowed by the mechanism ART, from the position of use PU to the advanced position of non-use PEZ. Close monitoring allows detecting an indirect contact between the first seat and the second seat, advantageously without this contact causing damage to the seating system 1. It may in particular concern the control device 3 with monitoring mode that is described in application FR 19 10011, or in application US Publication No. 2021/0070199A1 by the present Applicant.

Also, and according to one advantageous embodiment, the control device 3 is configured for measuring/detecting at least one operating parameter of the motor among the current I of the motor and/or the speed Vt of the motor, when the second seat 11 moves along a path of travel from the position of use PU to the position of non-use PEZ in a direction of movement of the second seat, when actuated by the motor 2 of the second seat 11, in easy entry mode, the control device 3 being configured to ensure the stopping of the motor when the at least one parameter of the current measurement crosses at least one threshold.

Advantageously, and notably, the at least one threshold has a plurality of determined values associated with different positions P0 to PN of the second seat 11 along the path of travel, at least in the direction of movement of the second seat from the position of use PU to the advanced position of non-use PEZ.

The control device 3 is then configured for, in at least easy entry mode (with monitoring), detecting/measuring the current position Pk of the second seat along the path of travel when it is actuated by the motor of the second seat, when the second seat is moving in the direction of movement, and comparing, for each of the different positions P0 to PN of the second seat along the path of travel, the current measurement of the at least one operating parameter of the motor with the threshold value associated with the operating parameter determined for the position associated with the current position Pk of the second seat, and so as to cause the stopping of the motor when the at least one threshold is crossed.

The determination of the values of at least one threshold in the different positions along the path of travel can advantageously be obtained during a calibration, prior to easy entry mode, by implementing the following steps:
- a measurement step a) in which the at least one parameter chosen among the current intensity or the speed of the motor during at least one movement of the second seat by the motor is measured in the different positions of the second seat along the path of travel, at least in the direction of movement,
- a determination step b) of determining the determined values of the at least one threshold in relation to the different positions of the seat in the direction of movement by applying a margin of tolerance with respect to the values of the operating parameter detected/measured during step a).

The margin of tolerance in step b) can be determined by calculation, by applying a multiplying factor to the measurements acquired in step a):
- greater than 1, for example between 1.05 and 1.30, to determine an upper threshold,
- less than 1, for example between 0.7 and 0.95, to determine a lower threshold.

For this purpose, the control device 3 may have calibration means configured to determine the values of the at least one threshold along the path of travel, in the different positions of the second seat 11 along the path of travel, at least in the direction of movement, in at least one calibration mode of the control device, prior to easy entry mode, by implementing:
- /A/ a measurement in which the at least one operating parameter chosen among the current and/or the speed of the motor is measured during at least one motorized movement of the second seat in the different positions of the second seat along the path of travel, at least in the direction of movement,
- /B/ a determination of the determined values of the at least one threshold in relation to the different positions of the seat, in the direction of movement, by applying a margin of tolerance with respect to the values of the operating parameter detected/measured during /A/.

The margin of tolerance in /B/ can be determined by calculation, by applying a multiplying factor to the measurements acquired in /A/:
- greater than 1, between 1.05 and 1.30, in order to determine an upper threshold, and/or
- less than 1, between 0.7 and 0.95, in order to determine a lower threshold.

The measurement according to /A/ can be implemented during the first movement of the second seat along the path of travel, or the measurement according to /A/ is implemented over several movements of the second seat according to the position of the seat along the path of travel.

More particularly, and as illustrated in FIG. 5, the control device 3 can comprise a microcontroller MCU recording the measurements Pk, $I_{Pk}$, and $Vt_{Pk}$ in /A/according to a sampling period, along the path of travel of the seat, which is less than the time used by the seat to travel the path of travel by a ratio of 10, or even by a ratio of 100.

The control device can detect an indirect contact CTI when the current measurement crosses an upper threshold of an operating parameter of the motor 2 relating to the current intensity, or a lower threshold of an operating parameter of the motor relating to the speed of the motor, or to a combination of the two parameters, current intensity and speed.

Such a control device 3 which notably comprises a threshold having a plurality of determined values associated with different positions P0 to PN of the second seat 11, advantageously makes it possible to perform close monitoring, in that it allows the detection of an indirect contact CTI, and the stopping of the seat, during a slight squeezing. Regardless of the position Pk of the second seat on the path of travel where the contact occurs, the threshold associated with this position Pk is optimized at the position of the seat in order to limit the force of the squeezing.

It should also be noted that the control device 3 is a squeeze-prevention safety device which allows protecting the seat even when no object (or child seat) is positioned on the second seat.

Notably, the values determined for different positions of the second seat along the path of travel in the direction of movement, can thus comprise:
- values of a first threshold associated with the different positions of the second seat when the means for detecting an attachment on the lower anchor does not detect an attachment (namely regarding the information child seat not detected), corresponding to operation of the second seat when empty, during easy entry mode,
- values of a second threshold associated with the different positions of the second seat when the means for detecting an attachment on the lower anchor detects an attachment (child seat detected), corresponding to an operation of the second seat loaded with the child seat, during easy entry mode.

The values of the first threshold can be the subject of the learning described above, in calibration mode in which the second seat is moved by the motor 2, notably when empty, with:
- the measurement step a) in which at least one parameter chosen among the current intensity or the speed of the motor during at least one motorized movement of the second seat is measured in the different positions of the second seat along the path of travel, the determination step b) of determining the determined values of the at least one threshold in relation to the different positions of the seat in the direction of movement by applying a margin of tolerance with respect to the values of the operating parameter detected/measured during step a), in particular by applying a multiplying factor.

The values of the second threshold are different in order to take into account the extra work to be provided by the motor 2 when moving the second seat loaded with the child seat 13, when the latter is detected by the detection means.

The second threshold values may be obtained in several ways.

According to a first possibility, it is possible to determine the values of the second threshold by applying to the parameters measured in step a), obtained with a second seat when empty, different multiplying factors than those used for the first threshold.

For example, and for the current intensity parameter of the motor, and after having obtained the measurements of measurement step a) for the current intensity in the different positions of the second seat (moved when empty), it may be possible to obtain:

an upper threshold Sh as the first threshold, associated with an operation when empty by applying a first multiplying factor, for example greater than 1, for example between 1.05 and 1.30, in order to determine the upper threshold (operation of the second seat when empty), an upper threshold Sh as a second threshold, associated with an operation of the loaded child seat by applying a second multiplying factor, greater than the first factor, greater than 1, for example between 1.15 and 1.60, in order to determine the upper threshold (loaded operation of the second seat).

In easy entry mode, the control device 3 compares, for each of the different positions P0 to PN of the second seat along the path of travel, the current measurement of the at least one operating parameter of the motor with the value of the threshold associated with the operating parameter determined for the position associated with the current position Pk of the second seat, and so as to cause the stopping of the motor when the at least one threshold is crossed.

In the event that the detection means do not detect the presence of the child seat (empty operation), the comparison implemented by the control device 3 is carried out with the values of the first threshold, namely the values of the threshold determined for an unloaded (empty) operation of the second seat.

In the case where the detection means detects the presence of the child seat (loaded operation), the comparison implemented by the control device 3 is carried out with the values of the second threshold, namely the values of the threshold determined for a loaded operation of the second seat.

Alternatively, the values of the second threshold may be determined by a calibration procedure for which the second seat is moved not when empty, but loaded with weight representative of the average load of a child seat.

The determination of the values of the at least one threshold (second threshold) in the different positions along the path of travel is obtained during a calibration, prior to easy entry mode, by implementing the following steps:

a measurement step a) in which the at least one parameter chosen among the current intensity or the speed of the motor during at least one movement of the second seat is measured in the different positions of the second seat along the path of travel, at least in the direction of movement, when the second seat is loaded with weight representative of a child seat, a determination step b) of determining the determined values of the at least one threshold in relation to the different positions of the seat in the direction of movement by applying a margin of tolerance with respect to the values of the operating parameter detected/measured during step a).

FIG. 5 illustrates an example architecture of the means of controlling and commanding the seating system, including the electric motor 2, for moving the second seat 11 along the path of travel (from the position of use PU, to the advanced position of non-use PEZ), and the control device 3.

The control device 3 comprises a microcontroller MCU, connected to the motor (circuit) board CM of the motor. The microcontroller MCU sends control signals to the motor circuit board CM to control the rotation of the motor 2 in one direction or the other. The control circuit board CM sends to the microcontroller MCU, in real time, the value(s) of the operating parameter(s) such as the current intensity (limit) and/or voltage.

The microcontroller MCU itself receives control signals, for example from a user interface, for example having buttons, making it possible to move the second seat in one direction or the other, in particular according to the settings desired by the user. The control signals comprise a control signal for actuating the easy entry mode, used in particular when a user wishes to enter the vehicle to sit in the third seat, or alternatively when an occupant of the third seat wishes to exit the vehicle.

The control device 3 further comprises an encoder Co used to measure the current position of the second seat. This encoder, in particular an angle encoder, can focus on the rotation of the rotor of the motor 2. This encoder Co sends measurement signals to a circuit board of the encoder CCo, which in turn sends a digital signal representative of the current position to the microcontroller MCU.

The control device 3 further comprises a memory for storing the values of the operating parameters, in particular the current intensity $I_{P_K}$, and the speed $Vt_{P_K}$ and positions Pk.

In calibration mode, the microcontroller MCU controls the movement of the second seat from position P0 to PN, in at least the first direction, and implements the automatic learning of the values of the operating parameters such as the current intensity I or the speed of the motor Vt during step a) which are stored in the memory ME as they are collected, with their associated positions Pk.

For this purpose, the microcontroller MCU records these measurements (Pk, $I_{P_k}$, and $Vt_{P_k}$) according to a sampling period, along the path of travel of the seat, that is much less than the time used by the seat to travel the path of travel which may be several seconds, for example 5 to 10 seconds. For example, the sampling period is less than the time used by the seat to complete the path of travel by a ratio of 10 or even a ratio of 100.

Advantageously, in particular in order to limit the size of the memory ME but without degrading performance, the microcontroller MCU may advantageously implement several successive sampling periods during step a) on the path of travel, including at least one sampling period close to the P0 end of the path and/or the PN end of the path, chosen to be smaller than the sampling period, used to record the values of the operating parameters of the seat in an intermediate portion of the path of travel.

Increasing the sampling frequency in these two portions near the two ends of the path of travel makes it possible to increase the precision of the measurements, in particular during the starting and stopping phases of the motor which have high variability in the values of the motor's operating parameters over time.

Preferably, the microcontroller can implement several movements in order to increase the reliability of the measurements: this makes it possible in particular to differentiate aberrational values that are too far from the other measurements, or to average the measurements.

The graph of FIG. 6, given solely for indicative purposes and to support the explanation, illustrates the current intensity of the motor on the ordinate and the position of the second seat in the path of travel on the abscissa, under normal conditions of use (fluid kinematics and without squeezing) during a first direction of movement, namely from the position of use PU to the advanced position of non-use PEZ.

This current intensity profile that is the object of the graph of FIG. 6 advantageously allows calibrating the device for the determination of the first threshold (upper threshold Sh and/or lower threshold Sb) associated with the first direction of movement, represented in the graph of FIG. 1 by two dotted profiles, the upper dotted curve representing the upper threshold Sh and the lower dotted curve representing the lower threshold Sb.

The diagram of FIG. 10 represents, in the block denoted MES-1, the measurement step a) in which, for FIG. 6, the current intensity of the movement of the backrest is measured in the different positions of the backrest P0 to PN along the path of travel, in the first direction of movement. Block CALC represents step b) of determining the determined values of the at least one threshold in relation to the different positions of the second seat 11, in the first direction of movement, by applying a margin of tolerance with respect to the values of the current intensity parameter detected/measured during step a).

In this current case, the upper threshold Sh (upper dotted curve) can be determined by calculation by applying a multiplying factor greater than 1, for example applying a factor of 1.15 for the first threshold (empty operation of the second seat) and applying a multiplying factor greater than 1, for example 1.40, for the second threshold (loaded operation of the second seat).

In this current case, the lower threshold Sb (lower dotted curve) can be determined by calculation by applying a multiplying factor of less than 1, for example a factor of 0.85.

FIG. 8 represents, solely as an example and to support the explanation, a speed profile of the motor when the second seat 2 is actuated in the first direction of movement S1 on the path of travel of the second seat from the position of use to the advanced position of non-use.

The diagram of FIG. 10 represents, in the block denoted MES-1, the measurement step a) in which, for FIG. 8, the speed of movement of the backrest is measured in the different positions of the backrest P0 to PN along the path of travel, in the first direction of movement. Block CALC represents step b) of determining the determined values of the at least one threshold in relation to the different positions of the second seat, in the first direction of movement, by applying a margin of tolerance with respect to the values of the speed parameter detected/measured during step a).

In this current case, the upper threshold SVh (upper dotted line) can be determined by calculation by applying a multiplying factor greater than 1, for example a factor of 1.15. Different multiplying factors can be used to distinguish empty operation (first threshold) from loaded operation (second threshold).

In this current case, the lower threshold SVb (lower dotted line) can be determined by calculation by applying a multiplying factor of less than 1, for example a factor of 0.85.

During the monitoring implemented during easy entry mode, the microcontroller MCU receives the operating parameters of the motor in real time, in particular the current intensity measurement signal from the motor circuit board CM and the position Pk measurement signal coming from the circuit board of the encoder CCo, and monitors in real time the values of the parameters stored for this position Pk in memory, by determining an upper and/or lower threshold value, for example by applying the multiplying factors.

The microcontroller MCU commands the motor to stop as soon as the upper threshold and/or the lower threshold is crossed, for example a crossing of the upper current intensity threshold and/or a crossing of the lower speed threshold indicates blockage or squeezing and in particular an indirect contact CTI, in particular a contact between the child seat carried on the second seat and the back of the third seat. Conversely, crossing the lower current intensity threshold and/or crossing the upper speed threshold indicates an anomaly in the seat mechanism such as breakage.

Thus, in FIG. 7 is shown the case where the measured current intensity exceeds the upper threshold Sh, which makes it possible to detect an indirect contact CTI between the first seat 10 and the second seat 11 via a squeezing of the child seat. The control device 3 causes the stopping ST of the motor 2 as illustrated in the operating diagram of FIG. 10.

FIG. 9 shows the case where the measured speed of rotation falls below the lower threshold, which makes it possible to detect an indirect contact CTI between the first seat 10 and the second seat 11 via a squeezing of the child seat. The control device 3 causes the stopping ST of the motor 2 as illustrated in the operating diagram of FIG. 10.

As soon as contact is detected, the control device 3 stops the second seat 11 in an optimized position, or even moves the second seat rearward very slightly by a distance on the order of 5 mm to 20 mm in order to eliminate the squeezing, the second seat still being in an intermediate position of non-use, optimized for access to the third seat, in particular when the first seat is advanced in concert by the control device.

By closely monitoring the speed and current intensity parameters, the control device 3 makes it possible to stop the second seat 11 with no risk of damage between the first seat and the second seat, or with no risk of damage to the child seat.

This disclosure also relates to a method for controlling a seating system 1 for a vehicle, comprising, from the front to the rear of the vehicle: a first seat 10 of a first row, a second seat 11 of a second row, and a third seat 12 in a third row, the first seat, second seat, and third seat being located one behind the other in a longitudinal direction d of the vehicle, the second seat 11 being provided with a mechanism ART configured to cause, at least in an easy entry mode, the transition of the second seat from a position of use PU configured to receive an occupant, to an advanced position of non-use PEZ configured to facilitate lateral access to the third seat 12 of the third row, under the action of a motor 2 controlled by a control device 3, and wherein the second seat is carrying an object, such as a child seat 13, resting on the seating portion or even against the backrest of the seat, and wherein, upon receiving a command to transition the second seat 11 from the position of use to the advanced position of non-use, the method comprises:

/a/ a motorized actuation of the second seat 11 from the position of use PU with a view to moving it into the advanced position of non-use PEZ, and possibly a motorized advancement of the first seat 10 from a current position to a position advanced towards the front of the vehicle, /b/ a limitation of the amplitude of the kinematics of the mechanism ART with a stopping of the motor 2 of the second seat 11 upon the control device 3 detecting a squeezing representative of an indirect contact between the first seat and the second seat via a squeezing of the object, in an advanced intermediate position of non-use of the second seat 12 configured to facilitate access to the third seat 12.

The seating system implemented in the control method can be that of the seating system according to this disclosure, including with the control device 3 allowing close monitoring of the parameters of the motor, current intensity and/or speed.

This disclosure also relates to a computer program comprising instructions for implementing all or part of a method according to this disclosure when the program is executed by a processor.

This disclosure relates to a seating system for a vehicle, comprising, from the front to the rear of the vehicle, a first seat of a first row, a second seat of a second row, optionally a third seat in a third row, and wherein the second seat is provided with a mechanism configured to cause it to advance towards the first seat.

In particular, the mechanism is configured to cause, at least in an easy-entry mode, the transition of the second seat from a position of use configured to receive an occupant, to an advanced position of non-use configured to facilitate lateral access to the third seat of the third row.

This disclosure also relates to a method for controlling such a seating system, as well as to a computer program which comprises a set of computer-readable instructions which, when loaded by an appropriate system, executes the steps of the control process.

This disclosure relates more particularly to the field of seating system having three rows of seats, in a longitudinal direction of the vehicle, comprising, from the front to the rear of the vehicle: a first seat of the first row, a second seat of the second row, and a third seat of the third row, arranged one behind the other. The seats of the three different rows (first seat(s), second seat(s), and third seat(s)) may comprise slides, connecting the seat to the floor and allowing the seat to advance or retreat by a sliding of the seat (seating portion and backrest) along the slide.

The field of this disclosure is more particularly that of seating systems for family vehicles, in particular of the minivan or SUV type, comprising three rows of seats. It is common for vehicles with three rows of seats to comprise, in the longitudinal direction, a first access opening (right and left) for access to the seats (first seat(s)) of the first row, delimited, in the longitudinal direction, between a front pillar and a central pillar of the body, and a second access opening (right and left) of the second row, delimited, in the longitudinal direction of the vehicle, between the central pillar and a rear pillar.

On the other hand, these vehicles may not to have a third opening (i.e. distinct from the first and second openings) for access (entry or exit) to the seats of the third row, namely the third seat(s).

One may facilitate access to the seat(s) of the third row by moving the second seat of the second row from a position of use allowing the presence of an occupant, to an advanced position of non-use referred to as "easy entry" in which the second seat is advanced towards the first seat.

Motor vehicle seats may have a comparative mechanism, hinged by means of connecting rods, allowing the seat to transition from a position of use capable of receiving an occupant to an advanced position of non-use called "Easy Entry" in which the seating portion is inclined towards the front, a front edge of the seating portion having been moved into a lowered position relative to a rear edge of the seating portion, the backrest then not folded down against the seating portion. This position of the seat facilitates access to the row of seats which is located behind the seat thus moved into the position of non-use, in particular when these seats are part of the second and third row and share a common access opening.

In comparative three-row seating systems, the kinematics of comparative hinge mechanisms of the various seats may be arranged one behind the other, or at the very least the programming of the various movements when the seats are motorized, are configured to avoid collisions between the various seats (therefore empty) arranged one behind the other.

For example, and when the second seat and first seat of a comparative seating system with three rows of seats are motorized, the movements of the comparative seats are programmed so that the second seat, then moved from its position of use to its advanced position of non-use, does not directly collide with the first seat of the first row.

Although this programming makes it possible to avoid direct collisions between comparative seats, there is always a risk of indirect collision between the first seat and the second seat while in its advanced position of non-use, when the second seat is carrying an object. The management of indirect collisions is difficult because the dimensions and shape of the object are unknown.

This is the case in particular when the second seat receives a child seat: this child seat can then become squeezed between the back of the backrest of the first seat and the second seat when the latter is moved to its advanced position of non-use. When this movement is motorized, comparative safety devices do not eliminate the risk of breaking the seat mechanisms or even damaging the child seat.

In order to avoid such a risk of breakage, the aforementioned comparative motorized three-row seating systems may be program the movements of the comparative seats to prohibit entirely the "easy entry" configuration, namely the forward movement of the second seat into the "easy entry" position, when a child seat is detected on this second seat by the vehicle's electronics. The presence of a child seat, when detected by the vehicle's electronics, therefore prevents the movement of the second seat into "easy entry" mode.

Although this prohibition of movement avoids squeezing the child seat between the first seat and the second seat, and thus the risk of breakage, the second seat carrying the child seat, then always in its position of use, does not allow access to the third row of seats. Access to the third row of seats is then blocked by the presence of the child seat.

A comparative rear seat comprising a lower anchor assembly, in particular according to the ISOFIX standard, may be used to anchor a child seat. Notably, the comparative lower anchor assembly comprises a segment of an electrical circuit, which is open when the seat anchor is not connected to the lower anchor assembly, and which is closed electrically when the seat is attached to the lower anchor assembly.

This (electrical) information is used in a method for avoiding interference between this rear seat equipped with the child seat, and a front seat, by restricting the path of travel of the front seat to a predefined movement sub-range.

This comparative method for avoiding interference between the first seat and the second seat receiving the child seat is open to criticism, in that child seats typically have different dimensions and different shapes, this method of avoiding interference involving restricting the travel of the front seat to a maximum rear position by using the most bulky child seat as a reference, which does not represent provide maximized management of the movements of the seats.

The present disclosure improves the situation.

This disclosure thus relates to a seating system for a vehicle, comprising, from the front to the rear of the vehicle: a first seat of a first row, a second seat of a second row comprising a mechanism of the second seat configured to advance the second seat towards the first seat.

According to this disclosure, the seating system comprises a control device configured to limit automatically the amplitude of the kinematics of the mechanism of the second seat, by the detection of an indirect contact between the second seat and the first seat when the mechanism of the second seat is operated.

The features set forth in the following paragraphs may optionally be implemented, independently of one another or in combination with one another:

According to one embodiment, the seating system comprises a third seat in a third row, the first seat, second seat, and third seat being located one behind the other in a longitudinal direction of the vehicle, the second seat being provided with the mechanism configured to cause, at least in an easy entry mode, the transition of the second seat from a position of use configured to receive an occupant, to an advanced position of non-use configured to facilitate lateral access to the third seat of the third row, and wherein the seating system comprises the control device configured to limit automatically the magnitude of the kinematics of the mechanism, by the detection of an indirect contact between the second seat and the first seat, when the mechanism of the second seat is operated, in easy entry mode, from the position of use to the advanced position of non-use.

According to one embodiment, the second seat receives a child seat, resting on a seating portion and/or against a backrest of the second seat, and wherein the indirect contact between the first seat and the second seat for which the control device limits automatically the amplitude of the kinematics of the hinge mechanism is a contact between the first seat and second seat via a squeezing of the child seat.

According to one embodiment, the seating system is motorized and the second seat comprises a motor configured to cause its advancement towards the first seat, and the control device is configured to control the stopping of the motor upon the detection of an indirect contact, possibly followed by a slight reverse movement of the second seat on the order of 5 mm to 20 mm.

In particular, the motor of the second seat is configured to cause, during a command actuating the easy entry mode, the movement of the second seat from the position of use to the advanced position of non-use, and the control device is configured to control the stopping of the motor upon the detection of an indirect contact, possibly followed by a slight reverse movement of the second seat on the order of 5 mm to 20 mm.

According to one embodiment of the motorized seating system, the first seat comprises slides connecting the first seat to the floor of the vehicle, the slides oriented in the longitudinal direction of the vehicle, and a motor of the first seat, configured to move the first seat forward or backward relative to the floor by the sliding of the slides, and wherein during the command actuating easy entry mode, the control device is configured for:

moving the first seat by sliding the slides under the action of the motor of the first seat from a current position of the first seat to an advanced position of the first seat, at least when no occupant is detected on the first seat, moving the second seat from the position of use to the advanced position of non-use while limiting the amplitude of the kinematics of the mechanism when an indirect contact is detected between the first seat and the second seat. During the indirect contact, the first seat is in the advanced position of the first seat when no occupant is detected, or in the current position of the first seat when an occupant is detected.

According to one embodiment of the motorized seating system, the second seat comprises two lower anchors, at the joining area between the seating portion and the backrest of the second seat, to which are respectively secured two attachment systems of the child seat, the or each of the two lower anchors comprising a means of detecting an attachment on the lower anchor, intended for detecting the presence of the child seat, wherein the control device is configured to cause, during the command actuating the easy entry mode, even in the case of detection of an attachment on the lower anchor by the detection means, the motorized movement of the second seat from the position of use to the advanced position of non-use, and wherein the control device is configured to cause the stopping of the motor of the second seat upon the detection of an indirect contact between the first seat and the second seat via a squeezing of the child seat.

According to one embodiment, the control device comprises a squeezing detection system, and the indirect contact is detected by detecting a squeezing.

Advantageously, and according to one embodiment of the motorized seating system, the control device can be configured for measuring/detecting at least one operating parameter of the motor among the motor current and/or the motor speed, when the second seat is moving forward along a path of travel (in particular from the position of use to the position of non-use), in a direction of movement of the second seat, when actuated by the second seat motor (in particular in easy entry mode), the control device being configured to ensure the stopping of the motor when the at least one parameter of the current measurement crosses at least one threshold, and wherein the at least one threshold has a plurality of determined values associated with different positions of the second seat along the path of travel permitted by the mechanism, at least in the forward direction of movement of the second seat (in particular from the position of use to the advanced position of non-use), the control device being configured for, at least in a monitoring mode (in particular in at least the easy entry mode), detecting/measuring a current position of the second seat along the path of travel during its actuation by the motor of the second seat, when the second seat is moving in the direction of movement, and comparing, for each of the different positions of the second seat along the path of travel, a current measurement of the at least one operating parameter of the motor with the value of the threshold associated with the operating parameter determined for the associated position at the current position of the second seat, and so as to cause the stopping of the motor when the at least one threshold is crossed.

According to one embodiment, the control device has calibration means configured for determining the values of the at least one threshold along the path of travel, in the different positions of the second seat along the path of travel, at least in the direction of movement, in at least one calibration mode of the control device, prior to the monitoring mode (in particular the easy entry mode), by implementing:

/A/ a measurement in which the at least one operating parameter chosen among the current and/or the speed of the motor is measured during at least one motorized movement of the second seat at the different positions of the second seat along the path of travel, at least in the direction of movement, /B/ a determination of the determined values of the at least one threshold in relation to the different positions of the seat, in the direction of movement, by applying a margin of tolerance with respect to the values of the operating parameter detected/measured during /A/.

The margin of tolerance in /B/ can be determined by calculation, by applying a multiplying factor to the measurements acquired in /A/:

greater than 1, between 1.05 and 1.30, in order to determine an upper threshold, and/or less than 1, between 0.7 and 0.95, in order to determine a lower threshold.

The measurement according to /A/ can be implemented during the first movement of the second seat along the path of travel, or else the measurement according to /A/ can be implemented over several movements of the second seat as a function of the position of the seat along the path of travel.

According to one embodiment, the control device comprises a microcontroller MCU recording the measurements in /A/ according to a sampling period, along the path of travel of the seat, which is less than the time used by the seat to travel the path of travel by a ratio of 10, or even by a ratio of 100.

According to one embodiment, the control device detects an indirect contact when a current measurement crosses an upper threshold of an operating parameter of the motor relating to the current intensity and/or a lower threshold of an operating parameter of the motor relating to the speed of the motor.

According to one embodiment, the values determined according to different positions of the second seat along the path of travel in the direction of movement, comprise:

values of a first threshold associated with the different positions of the second seat when the means for detecting an attachment on the lower anchor does not detect any attachment, corresponding to an operation of the empty second seat during easy entry mode, values of a second threshold associated with the different positions of the second seat when the means for detecting an attachment on the lower anchor detects an attachment, corresponding to an operation of the second seat loaded with the child seat, during easy entry mode.

According to one embodiment, the mechanism comprises connecting rods ensuring the kinematics of the second seat from the first position of use to the advanced position of non-use, facilitating access to the third seat, and wherein the kinematics comprise a tilting of the second seat including:

an inclination of the seating portion for which the front edge of the seating portion is moved to a level lower than the rear edge of the seating portion, the backrest not being folded down against the seating portion, or even an increase in the angle of the opening between the seating portion and the backrest.

According to a second aspect, this disclosure relates to a method for controlling a seating system for a vehicle, comprising, from the front to the rear of the vehicle: a first seat of a first row, a second seat of a second row, and a third seat in a third row, the first seat, second seat, and third seat being located one behind the other in a longitudinal direction of the vehicle, the second seat being provided with a mechanism configured to cause, at least in an easy entry mode, the transition of the second seat from a position of use configured to receive an occupant, to an advanced position of non-use configured to facilitate lateral access to the third seat of the third row, under the action of a motor controlled by a control device, and wherein the second seat carries an object, such as a child seat, resting on the seating portion or even against the backrest of the seat, and wherein, upon receiving a command to transition the second seat from the position of use to the advanced position of non-use, the method comprises:

/a/ a motorized actuation of the second seat from the position of use with a view to moving it into the advanced position of non-use, and possibly a motorized advancement of the first seat from a current position to a position advanced towards the front of the vehicle, /b/ a limitation of the amplitude of the kinematics of the mechanism with a stopping of the motor of the second seat upon the control device detecting a squeezing representative of an indirect contact between the first seat and the second seat via a squeezing of the object, in an advanced intermediate position of non-use of the second seat configured to facilitate access to the third seat.

According to a third aspect, this disclosure relates to a computer program comprising instructions for implementing all or part of a method according to this disclosure when the program is executed by a processor.

Seating system for a vehicle, comprising, from the front to the rear of the vehicle: a first seat, a second seat (11), a third seat, the first seat, second seat, and third seat being located one behind the other in a longitudinal direction (d) of the vehicle, the second seat (11) being provided with a mechanism configured to cause, at least in an easy entry mode, the transition of the second seat from a position of use to an advanced position of non-use (PEZ) configured to facilitate lateral access to the third seat in the third row, and wherein a control device (3) configured to limit automatically the amplitude of the kinematics of the mechanism, by the detection of an indirect contact (CTI) between the second seat (11) and the first seat (10), when the mechanism of the second seat (11) is operated, in easy entry mode, from the position of use to the advanced position of non-use.

The invention claimed is:

1. A seating system for a vehicle, the seating system comprising, from the front to the rear of the vehicle,
a first seat of a first row,
a second seat of a second row, and
a third seat in a third row,
wherein the first seat, second seat, and third seat are located one behind the other in a longitudinal direction of the vehicle, the second seat being provided with a mechanism configured to cause, at least in an easy entry mode, the transition of the second seat from a position of use configured to receive an occupant, to an advanced position of non-use configured to facilitate lateral access to the third seat of the third row, under the action of a motor controlled by a control device, and wherein the second seat carries an object resting on a seating portion or a backrest of the second seat, and wherein the control device, upon receiving a command to transition the second seat from the position of use to the advanced position of non-use, causes motorized actuation of the second seat from the position of use with a view to moving it into the advanced position of non-use, and motorized advancement of the first seat from a current position to a position advanced towards the front of the vehicle, and limitation of the amplitude of the kinematics of the mechanism of the second seat with a stopping of the motor of the second seat upon the control device detecting a squeezing representative of an indirect contact between the first seat and the second seat via a squeezing of the object, in an advanced intermediate position of non-use of the second seat configured to facilitate access to the third seat.

2. The seating system of claim 1, wherein the first seat comprises slides connecting the first seat to the floor of the vehicle, the slides oriented in the longitudinal direction of the vehicle, and a motor of the first seat, configured to move the first seat forward or backward relative to the floor by the sliding of the slides, and wherein, during the command actuating easy entry mode, the control device is configured for: moving the first seat by sliding the slides under the action of the motor of the first seat from a current position of the first seat to an advanced position of the first seat, at least when no occupant is detected on the first seat, moving the second seat from the position of use to the advanced position of non-use while limiting the amplitude of the hinge kinematics when an indirect contact is detected between the first seat and the second seat, in the advanced position of the first seat when no occupant is detected, or in the current position of the first seat when an occupant is detected.

3. The seating system of claim 1, wherein the control device is configured for measuring/detecting at least the operating parameter of the motor among the current of the motor and/or the speed of the motor, when the second seat is moving forward along the path of travel allowed by the mechanism, from the position of use to the position of non-use in a direction of movement of the second seat, when actuated by the motor of the second seat, in easy entry mode, and wherein the control device is configured for, in easy entry mode, detecting/measuring a current position of the second seat along the path of travel during its actuation by the motor of the second seat, when the second seat is moving in the direction of movement, and comparing, for each of the different positions of the second seat along the path of travel, a current measurement of the at least one operating parameter of the motor with the value of the threshold associated with the operating parameter determined for the associated position at the current position of the second seat, and so as to cause the stopping of the motor when the at least one threshold is crossed.

4. The seating system of 3, wherein the control device detects an indirect contact when a current measurement crosses an upper threshold of an operating parameter of the motor relating to the current intensity and/or a lower threshold of an operating parameter of the motor relating to the speed of the motor.

5. The seating system of claim 1, wherein the mechanism comprises connecting rods ensuring the kinematics of the second seat from the first position of use to the advanced position of non-use facilitating access to the third seat, and wherein the kinematics comprise a tilting of the second seat including:

an inclination of the seating portion for which the front edge of the seating portion is at a lower level than the rear edge of the seating portion, the backrest not being folded down against the seating portion, or optionally an increase in the angle of the opening between the seating portion and the backrest.

6. The seating system of claim 1, wherein the second seat receives a child seat, resting on a seating portion and/or against a backrest of the second seat, and wherein the indirect contact between the first seat and the second seat for which the control device limits automatically the amplitude of the kinematics of the mechanism is a contact between the first seat and the second seat, via a squeezing of the child seat.

7. The seating system of claim 6, wherein the seating system is motorized, wherein the second seat comprises two lower anchors, at the joining area between the seating portion and the backrest of the second seat, to which are respectively secured two attachment systems of the child seat, the or each of the two lower anchors comprising a means of detecting an attachment on the lower anchor, intended for detecting the presence of the child seat, wherein the control device is configured to cause, during the command actuating the easy entry mode, even in the case of detection of an attachment on the lower anchor by the detection means, the motorized movement of the second seat from the position of use to the advanced position of non-use, and wherein the control device is configured to cause the stopping of the motor of the second seat upon the detection of an indirect contact between the first seat and the second seat via a squeezing of the child seat.

8. The seating system of claim 1, wherein the control device is configured to control the stopping of the motor upon the detection of an indirect contact, followed by a small reverse movement of the second seat on the order of 5 mm to 20 mm.

9. The seating system of claim 8, wherein the control device is configured for measuring/detecting at least one operating parameter of the motor among the current of the motor and/or the speed of the motor, when the second seat is moving forward along a path of travel permitted by the mechanism, the control device being configured to ensure the stopping of the motor when the at least one parameter of the current measurement crosses at least one threshold, and wherein the at least one threshold has a plurality of determined values associated with different positions of the second seat along the path of travel permitted by the mechanism, at least in the direction of movement of the second seat, the control device being configured for, at least in a monitoring mode, detecting/measuring a current position of the second seat along the path of travel during its actuation by the motor of the second seat, when the second seat is moving in the direction of movement, and comparing, for each of the different positions of the second seat along the path of travel, a current measurement of the at least one operating parameter of the motor with the value of the threshold associated with the operating parameter determined for the associated position at the current position of the second seat, and so as to cause the stopping of the motor when the at least one threshold is crossed.

10. The seating system of claim 9, wherein the control device has calibration means configured for determining the values of the at least one threshold along the path of travel, in the different positions of the second seat along the path of travel, at least in the direction of movement, in at least one calibration mode of the control device, prior to the monitoring mode, by implementing:
- a. a measurement in which the at least one operating parameter chosen among the current and/or the speed of the motor is measured during at least one movement of the second seat at the different positions of the second seat along the path of travel, at least in the direction of movement,
- b. a determination of the determined values of the at least one threshold in relation to the different positions of the seat, in the direction of movement, by applying a margin of tolerance with respect to the values of the operating parameter detected/measured during a.

11. The seating system of claim 10, wherein the margin of tolerance in b. is determined by calculation, by applying a multiplying factor to the measurements acquired in a.: greater than 1, between 1.05 and 1.30, in order to determine an upper threshold, and/or less than 1, between 0.7 and 0.95, in order to determine a lower threshold.

12. The seating system of claim 10, wherein the measurement according to a. is implemented during the first movement of the second seat along the path of travel, or else the measurement according to a. is implemented over several movements of the second seat as a function of the position of the seat along the path of travel.

13. The seating system of claim 10, wherein the control device comprises a microcontroller recording the measurements in a. according to a sampling period, along the path of travel of the seat, which is less than the time used by the seat to travel the path of travel by a ratio of 10, or even by a ratio of 100.

14. The seating system of claim 9, wherein the seating system is motorized, wherein the second seat comprises two lower anchors, at the joining area between the seating portion and the backrest of the second seat, to which are respectively secured two attachment systems of the child seat, the or each of the two lower anchors comprising a means of detecting an attachment on the lower anchor, intended for detecting the presence of the child seat, wherein the control device is configured to cause, during the command actuating the easy entry mode, even in the case of detection of an attachment on the lower anchor by the detection means, the motorized movement of the second seat from the position of use to the advanced position of non-use, wherein the control device is configured to cause the stopping of the motor of the second seat upon the detection of an indirect contact between the first seat and the second seat via a squeezing of the child seat, and wherein the values determined according to different positions of the second seat along the path of travel in the direction of movement, comprise:
- values of a first threshold associated with the different positions of the second seat when the means for detecting an attachment on the lower anchor does not detect any attachment, corresponding to an operation of the second seat when empty during easy entry mode,
- values of a second threshold associated with the different positions of the second seat when the means for detecting an attachment on the lower anchor detects an attachment, corresponding to an operation of the second seat loaded with the child seat, during easy entry mode.

15. The seating system of claim 1, wherein the seating system is motorized and wherein the control device comprises a squeezing detection system, and wherein the indirect contact is detected by detecting a squeezing.

16. A method for controlling a seating system for a vehicle, comprising, from the front to the rear of the vehicle:
- a first seat of a first row,
- a second seat of a second row, and
- a third seat in a third row, the first seat, second seat, and third seat being located one behind the other in a longitudinal direction of the vehicle, the second seat being provided with a mechanism configured to cause, at least in an easy entry mode, the transition of the second seat from a position of use configured to receive an occupant, to an advanced position of non-use configured to facilitate lateral access to the third seat of the third row, under the action of a motor controlled by a control device, and
- wherein the second seat carries an object, such as a child seat, resting on the seating portion or even against the backrest of the seat, and
- wherein, upon receiving a command to transition the second seat from the position of use to the advanced position of non-use, the method performed by a microcontroller of the control device, the method comprises:
- a. moving the second seat from the position of use toward the advanced position of non-use, and moving the first seat from a current position to a position advanced towards the front of the vehicle,
- b. limiting the amplitude of the kinematics of the mechanism of the second seat by stopping the motor of the second seat upon the control device detecting a squeezing representative of an indirect contact between the first seat and the second seat via a squeezing of the object, in an advanced intermediate position of non-use of the second seat configured to facilitate access to the third seat.

17. A computer program when executed by a processor included in the microcontroller performing the steps of:
- moving the second seat from the position of use toward the advanced position of non-use, and moving the first seat from a current position to a position advanced towards the front of the vehicle,
- limiting the amplitude of the kinematics of the mechanism of the second seat by stopping the motor of the second seat upon the control device detecting a squeezing representative of an indirect contact between the first seat and the second seat via a squeezing of the object, in an advanced intermediate position of non-use of the second seat configured to facilitate access to the third seat.

* * * * *